US012436557B1

(12) United States Patent
Zeng et al.

(10) Patent No.: US 12,436,557 B1
(45) Date of Patent: Oct. 7, 2025

(54) ROCKER DEVICE AND REMOTE CONTROL

(71) Applicant: GUANGDONG K-SILVER INDUSTRIAL CO., LTD., Shenzhen (CN)

(72) Inventors: Xiao Zeng, Shenzhen (CN); Jianbo Zhao, Shenzhen (CN); Hui Qiu, Shenzhen (CN)

(73) Assignee: GUANGDONG K-SILVER INDUSTRIAL CO., LTD., Shenzhen (CN)

( * ) Notice: Subject to any disclaimer, the term of this patent is extended or adjusted under 35 U.S.C. 154(b) by 0 days.

(21) Appl. No.: 18/804,391

(22) Filed: Aug. 14, 2024

(30) Foreign Application Priority Data

Jul. 22, 2024 (CN) ......................... 202421742203.3

(51) Int. Cl.
*G05G 9/047* (2006.01)

(52) U.S. Cl.
CPC ... *G05G 9/047* (2013.01); *G05G 2009/04725* (2013.01); *G05G 2009/04755* (2013.01)

(58) Field of Classification Search
CPC ......... G05G 9/047; G05G 2009/04725; G05G 2009/04755
See application file for complete search history.

(56) References Cited

U.S. PATENT DOCUMENTS

2025/0036153 A1* 1/2025 Tian ......................... G05G 1/04

* cited by examiner

*Primary Examiner* — Robert J Michaud
(74) *Attorney, Agent, or Firm* — Westbridge IP LLC

(57) ABSTRACT

A rocker device includes: a shell, a support, a rocker, a reset member, a hall sensor assembly and a circuit board. The support is provided in the shell, and the support and the shell surround a cavity with an opening on one side; the rocker includes a rod body and a skirt provided on the rod body, and the skirt is movably provided at the cavity from the opening; the rod body has an operating end and a sensing end opposite to the operating end along an axial direction of the rod body, the sensing end is provided in the shell, and the operating end is configured to extend out of the shell; the reset member is provided in the cavity and is provided around the support, and the reset member is also abutted against a side of the skirt away from the rod body.

8 Claims, 5 Drawing Sheets

ROCKER DEVICE AND REMOTE CONTROL

CROSS-REFERENCE TO RELATED APPLICATIONS

This application claims priority to Chinese Patent Application No. 202421742203.3, filed on Jul. 22, 2024, the entire contents of which are incorporated herein by reference.

TECHNICAL FIELD

The present application relates to the technical field of remote control, and in particular to a rocker device and a remote control.

BACKGROUND

In modern control systems and human-computer interaction devices, rocker devices are widely used in game controllers, drone remote controls, robot control, etc. However, the existing rocker devices are generally too thick, which limits their application in portable devices.

SUMMARY

The main purpose of the present application is to provide a rocker device and a remote control, aiming to solve the problem that the rocker device is too thick.

To achieve the above purpose, the present application provides a rocker device, including: a shell, a support, a rocker, a reset member, a hall sensor assembly and a circuit board. The support is provided in the shell, the support and the shell enclose a cavity with an opening on a side. The rocker includes a rod body and a skirt provided at the rod body. The skirt is movably provided at the cavity from the opening. The rod body includes an operating end and a sensing end opposite to the operating end along an axial direction of the rod body, the sensing end is provided in the shell, and the operating end is configured to extend out of the shell. The reset member is provided in the cavity and provided around the support, the reset member is abutted against a side of the skirt away from the rod body. The hall sensor assembly includes a hall element and a magnet, the magnet is provided at the sensing end of the rod body, and the hall element corresponds to a position of the magnet. The circuit board is provided at the shell, the hall element is provided on the circuit board and is electrically connected to the circuit board.

In an embodiment, the shell includes a base and an upper shell, the circuit board is provided on the base, an inner wall surface of the upper shell is a concave arc surface, a surface of the support close to the upper shell is a convex arc surface, and the operating end is configured to pass through the upper shell.

In an embodiment, the rocker device further includes a stop assembly, the stop assembly is provided between the support and the circuit board, and the stop assembly is sleeved on the sensing end of the rod body.

In an embodiment, the stop assembly includes a first limiter and a second limiter mounted on the first limiter, a spacing is formed between the first limiter and the support, the second limiter is movably provided at the spacing along the first limiter, the first limiter is provided with a first slide groove, the second limiter is provided with a second slide groove, an extension direction of the first slide groove intersects an extension direction of the second slide groove, and the sensing end is inserted into the first slide groove and the second slide groove.

In an embodiment, the rocker device further includes a convex strip, the convex strip is provided on one side of the first limiter close to the second limiter, and the second limiter is mounted on the convex strip.

In an embodiment, an outer wall of the first limiter is provided with a clamping portion, the support is provided with a clamping groove for mounting with the clamping portion, the upper shell is provided with a positioning portion, and the support is provided with a positioning groove corresponding to a position of the positioning portion.

In an embodiment, the rocker device further includes an elastic member, part of the elastic member is provided between the support and the first limiter, and the elastic member is abutted against the circuit board, or the elastic member is abutted against the base.

In an embodiment, a groove is provided on one side of the elastic member facing the base.

In an embodiment, the reset member is a tension spring connected end to end.

In an embodiment, the present application also provides a remote control, the remote control includes a remote control body and the above described rocker device.

In technical solutions of the present application, the support and the rocker are improved, and the hall sensor assembly is also used, such that position information can be input through the rocker device without the need for an upper and lower rocker arm, thereby simplifying the structure of the rocker device and making the overall thickness of the rocker device smaller.

BRIEF DESCRIPTION OF THE DRAWINGS

In order to more clearly illustrate the embodiments of the present application or the technical solutions in the related art, the drawings required for use in the embodiments or the description of the related art will be briefly introduced below. Obviously, the drawings described below are only some embodiments of the present application. For those skilled in the art other drawings can be obtained based on the structures shown in these drawings without creative work.

Figure 1:
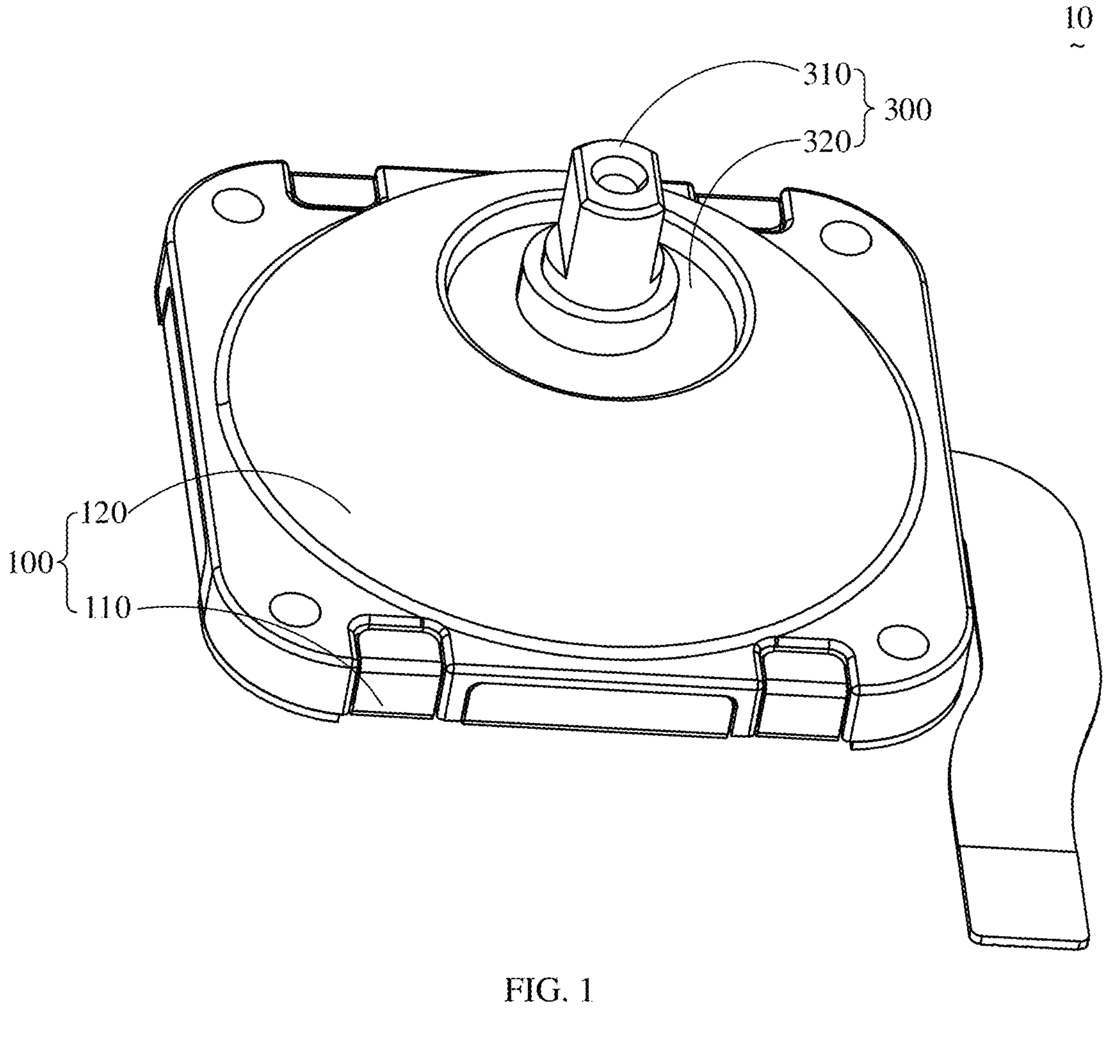
FIG. 1 is a schematic structural view of a rocker device according to an embodiment of the present application.
Figure 2:
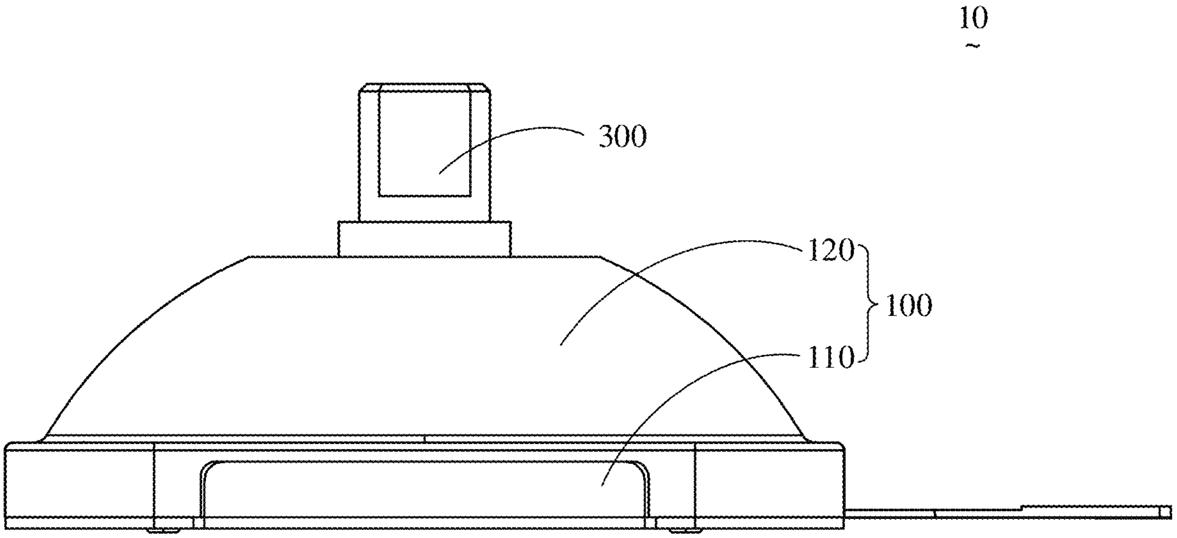
FIG. 2 is a side view of FIG. 1.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that if there is a directional indication (such as up, down, left, right, front, rear) in the embodiments of the present application, the directional indication is only used to explain the relative positional relationship, movement, etc. of the components in a certain posture (as shown in the drawings). If the specific posture changes, the directional indication will change accordingly.

Besides, the descriptions associated with, e.g., “first” and “second,” in the present application are merely for descriptive purposes, and cannot be understood as indicating or suggesting relative importance or impliedly indicating the number of the indicated technical feature. Therefore, the feature associated with “first” or “second” can expressly or impliedly include at least one such feature. The meaning of “and/or” appearing in the present application includes three parallel scenarios. For example, “A and/or B” includes only A, or only B, or both A and B. In addition, the technical solutions between the various embodiments can be combined with each other, but they must be based on the realization of those of ordinary skill in the art. When the combination of technical solutions is contradictory or cannot be achieved, it should be considered that such a combination of technical solutions does not exist, nor is it within the scope of the present application.

As shown in FIG. 1 to FIG. 5, in an embodiment, the rocker device 10 includes: a shell 100, a support 200, a rocker 300, a reset member 400, a hall sensor assembly 500 and a circuit board 600.

In an embodiment, the support 200 is provided in the shell 100, and the support 200 and the shell 100 enclose a cavity 11 with an opening on a side. The rocker 300 includes a rod body 310 and a skirt 320 provided at the rod body 310, the skirt 320 is movably provided at the cavity 11 from the opening. The rod body 310 includes an operating end 311 and a sensing end 312 opposite to the operating end 311 along an axial direction of the rod body 310, the sensing end 312 is provided in the shell 100, and the operating end 311 is configured to extend out of the shell 100. The reset member 400 is provided in the cavity 11 and provided around the support 200, and the reset member 400 is also abutted against a side of the skirt 320 away from the rod body 310. The hall sensor assembly 500 includes a hall element 510 and a magnet 520, the magnet 520 is provided at the sensing end 312 of the rod body 310, and the hall element 510 corresponds to a position of the magnet 520. The circuit board 600 is provided at the shell 100, and the hall element 510 is provided on the circuit board 600 and is electrically connected to the circuit board 600.

In an embodiment, working principle: the hall sensor assembly 500 in the rocker device 10 is configured to detect the user’s operation on the rocker 300, which mainly refers to the movement of the rocker 300 in at least one direction of the X, Y and Z axes. When the user moves the rocker 300, the position and angle of the magnet 520 change accordingly. This change causes a magnetic field detected by the hall element 510 to change. The hall element 510 is configured to detect the change in the magnetic field according to the hall effect principle and to generate a corresponding voltage signal. The magnitude and direction of this voltage signal are proportional to the change in the magnetic field. The voltage signal generated by the hall element 510 is transmitted to the processor on the circuit board. The processor converts these voltage signals into digital signals or analog signals, and outputs the converted signals to the main control board of the corresponding control system or device to perform corresponding operations, such as moving the cursor, controlling the robot, adjusting the viewing angle in the game, etc. The voltage signal includes information characterizing the magnitude and direction of the voltage signal, and the processor can determine the position and angle of the joystick 300 according to the voltage signal.

In an embodiment, the shell 100 mainly is configured to protect the internal electronic components and to provide mechanical support. In order to facilitate the installation of various components, the shell 100 includes a base 110 and an upper shell 120, and the base 110 and the upper shell 120 are detachably connected.

In an embodiment, the rocker 300 includes a rod body 310 and a skirt 320 provided at the rod body 310. The skirt 320 is movably provided at the cavity 11 from the opening. The skirt 320 is usually provided in an annular shape, and the cavity 11 is usually an annular cavity 11. The rod body 310 includes an operating end 311 and a sensing end 312 provided opposite to each other along the rod body’s axial direction. The sensing end 312 is provided in the shell 100, and the operating end 311 is configured to extend out of the shell 100. The operating end 311 is the user’s dial end.

The reset member 400 is configured to reset the rocker 300 to its initial position after the user completes the action of toggling the rocker 300 and releases the rocker 300. The initial position is the default position set by the rocker device 10. The reset member 400 can be a tension spring connected end to end, or an annular rubber ring, etc. The annular rubber ring usually requires sufficient elastic force. In an embodiment, the reset member 400 is a tension spring connected end to end. The tension spring connected end to end has the advantages of simple installation, etc.

In an embodiment, the circuit board 600, also called the printed circuit board 600 (PCB), is a supporting base for electronic components and is used in electronic devices to achieve electrical connection and signal transmission between electronic components.

In technical solutions of the present application, the support 200 and the rocker 300 are improved, and the hall sensor assembly 500 is also used, such that position information can be input through the rocker device 10 without the need for an upper and lower rocker arm, thereby simplifying the structure of the rocker device 10 and making the overall thickness of the rocker device 10 smaller.

In an embodiment, the shell 100 includes a base 110 and an upper shell 120, the circuit board 600 is provided on the base 110, an inner wall surface of the upper shell 120 is a concave arc surface, a surface of the support 200 close to the upper shell 120 is a convex arc surface, and the operating end 311 is configured to pass through the upper shell 120. The skirt includes a first surface and a second surface that are provided opposite to each other, the first surface is adapted to the shape of the upper shell 120, and the second surface is adapted to the shape of the support member 200. In this way, the skirt 320 of the rocker 300 can better fit the shape of the cavity 11, reduce the gap between the rocker 300 and the shell 100, the rocker 300 and the support 200, and further reduce the volume of the rocker device 10.

In an embodiment, the rocker device 10 further includes a stop assembly 700, the stop assembly 700 is provided between the support 200 and the circuit board 600, and the stop assembly 700 is sleeved on the sensing end 312 of the rod body 310. In this way, there is clear tactile feedback when the rocker 300 is moved by setting the limit assembly 700, so as to provide a better user experience.

Figure 3:
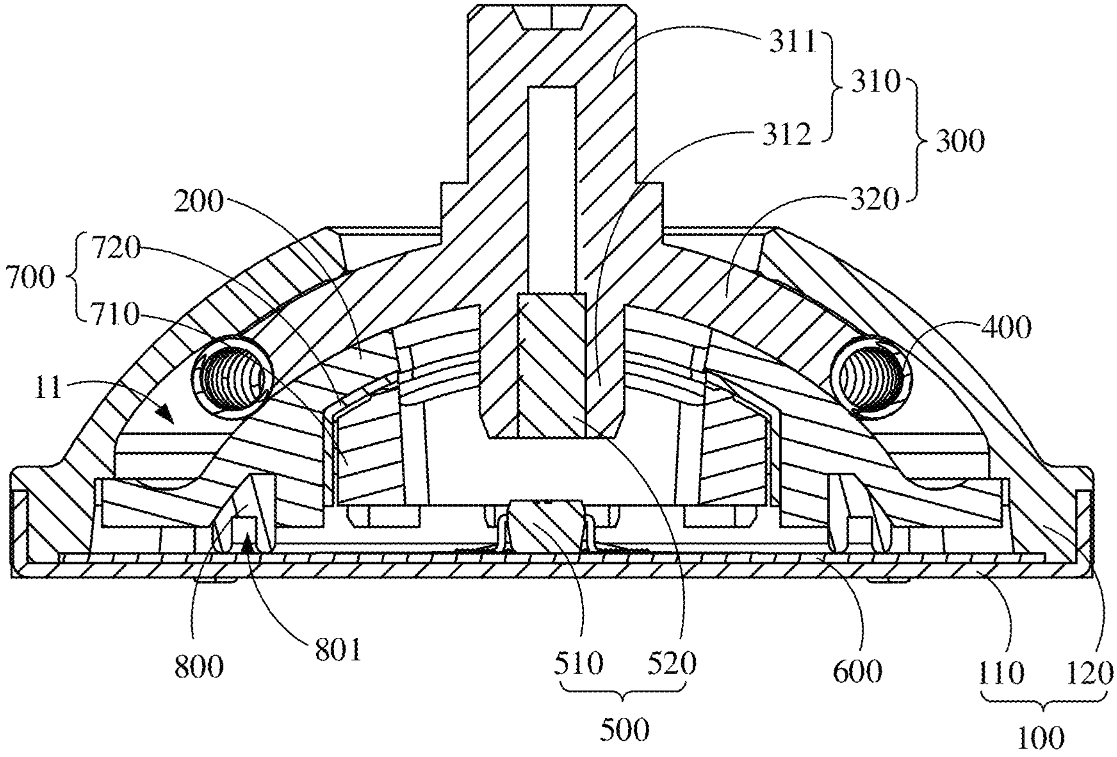
FIG. 3 is a cross-sectional view of FIG. 1 in one direction.
Figure 4:
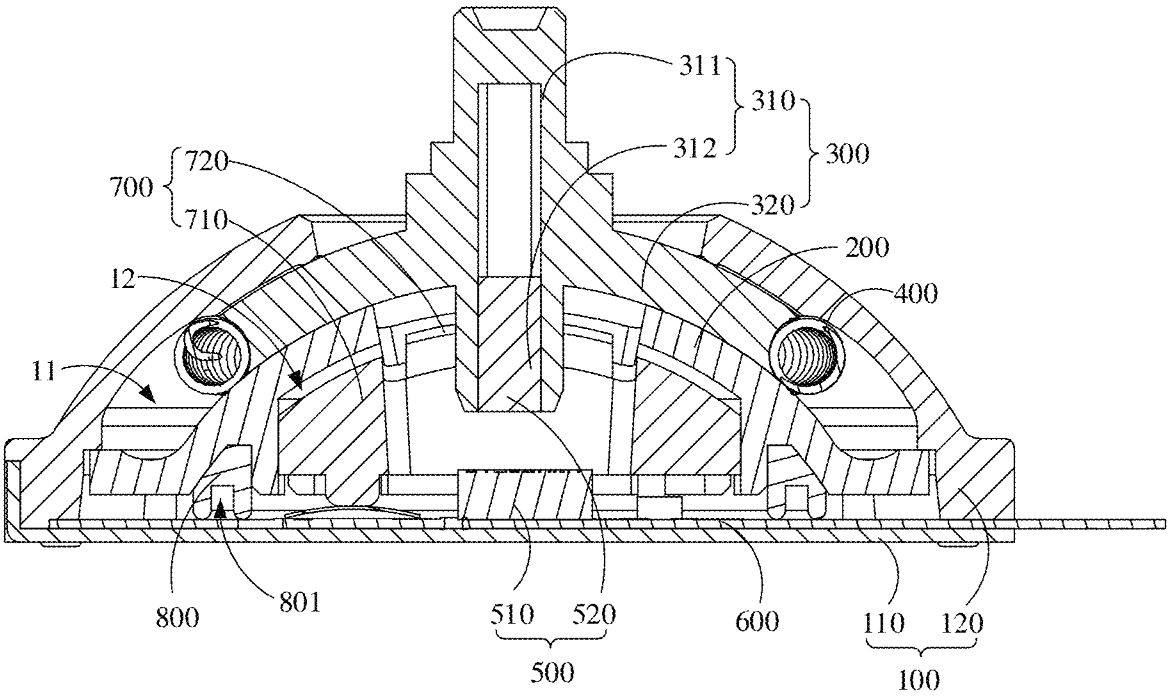
FIG. 4 is a cross-sectional view of FIG. 1 in another direction.
Figure 5:
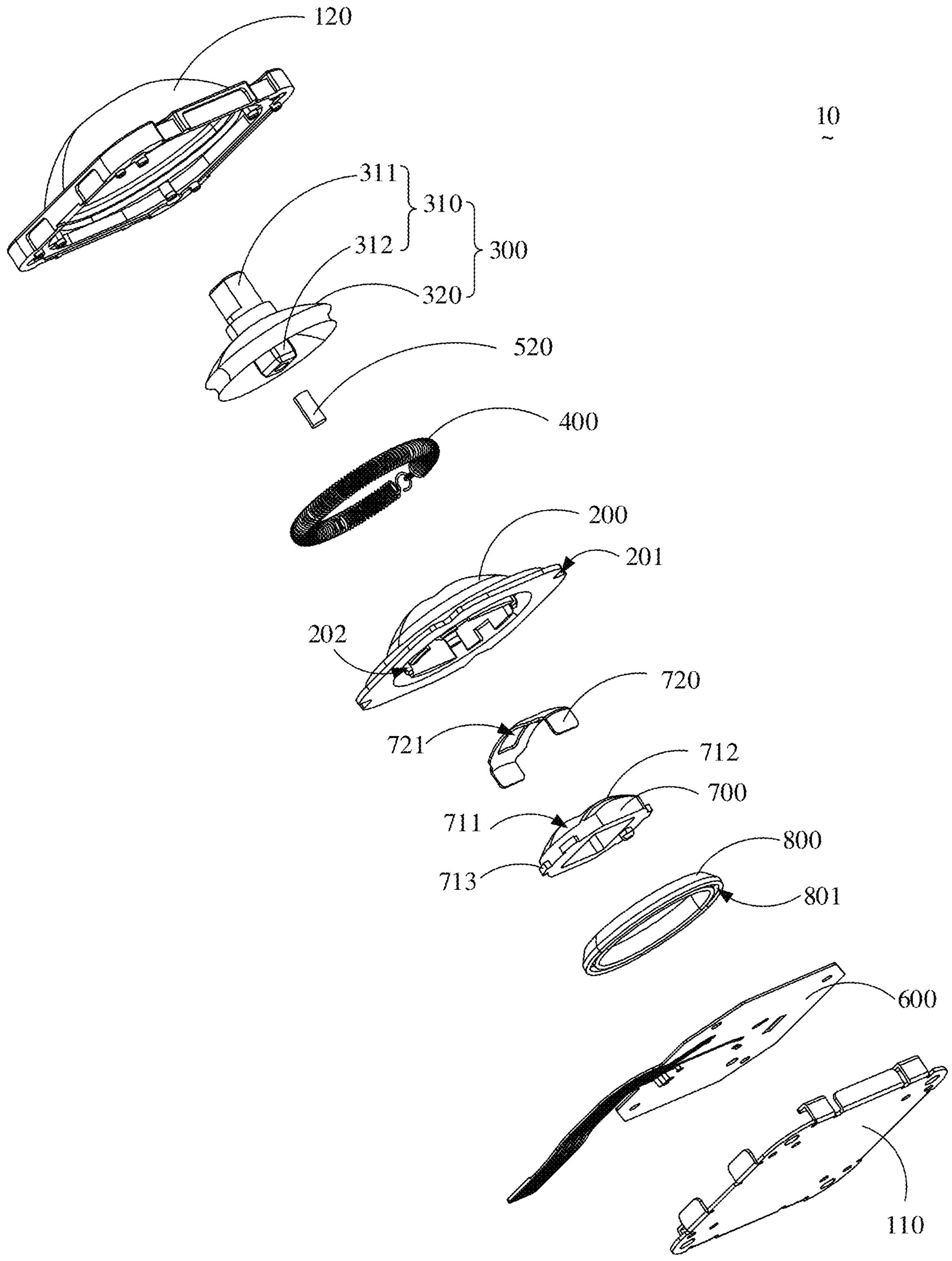
FIG. 5 is an exploded view of FIG. 1.

In an embodiment, as shown in FIG. 3, the stop assembly 700 includes a first limiter 710 and a second limiter 720 mounted on the first limiter 710, a spacing 12 is formed between the first limiter 710 and the support 200, and the second limiter 720 is movably provided at the spacing 12 along the first limiter 710; the first limiter 710 is provided with a first slide groove 711, and the second limiter 720 is provided with a second slide groove 721, and an extension direction of the first slide groove 711 intersects an extension direction of the second slide groove 721 are provided to intersect; and the sensing end 312 is inserted into the first slide groove 711 and the second slide groove 721. Thus, the position limiting assembly 700 is configured in such a way that the user has clear tactile feedback when moving the rocker 300, but it will not be too strenuous. In an embodiment, as shown in FIG. 5, a convex strip 712 is provided on one side of the first limiter close to the second limiter, and the second limiter is mounted on the convex strip 712.

In an embodiment, in order to further simplify the structure of the rocker device 10, an outer wall of the first limiter 710 is provided with a clamping portion 713, the support 200 is provided with a clamping groove 201 for mounting with the clamping portion 713. The upper shell 120 is provided with a positioning portion, and the support 200 is provided with a positioning groove corresponding to the position of the positioning portion. In this way, in this embodiment, the first limiter 710, the support 200 and the upper shell 120 that play a supporting and limiting role are connected by forming a buckle structure by themselves, and no other connecting components are required, thereby further simplifying the structure of the rocker device 10.

Figure 6:
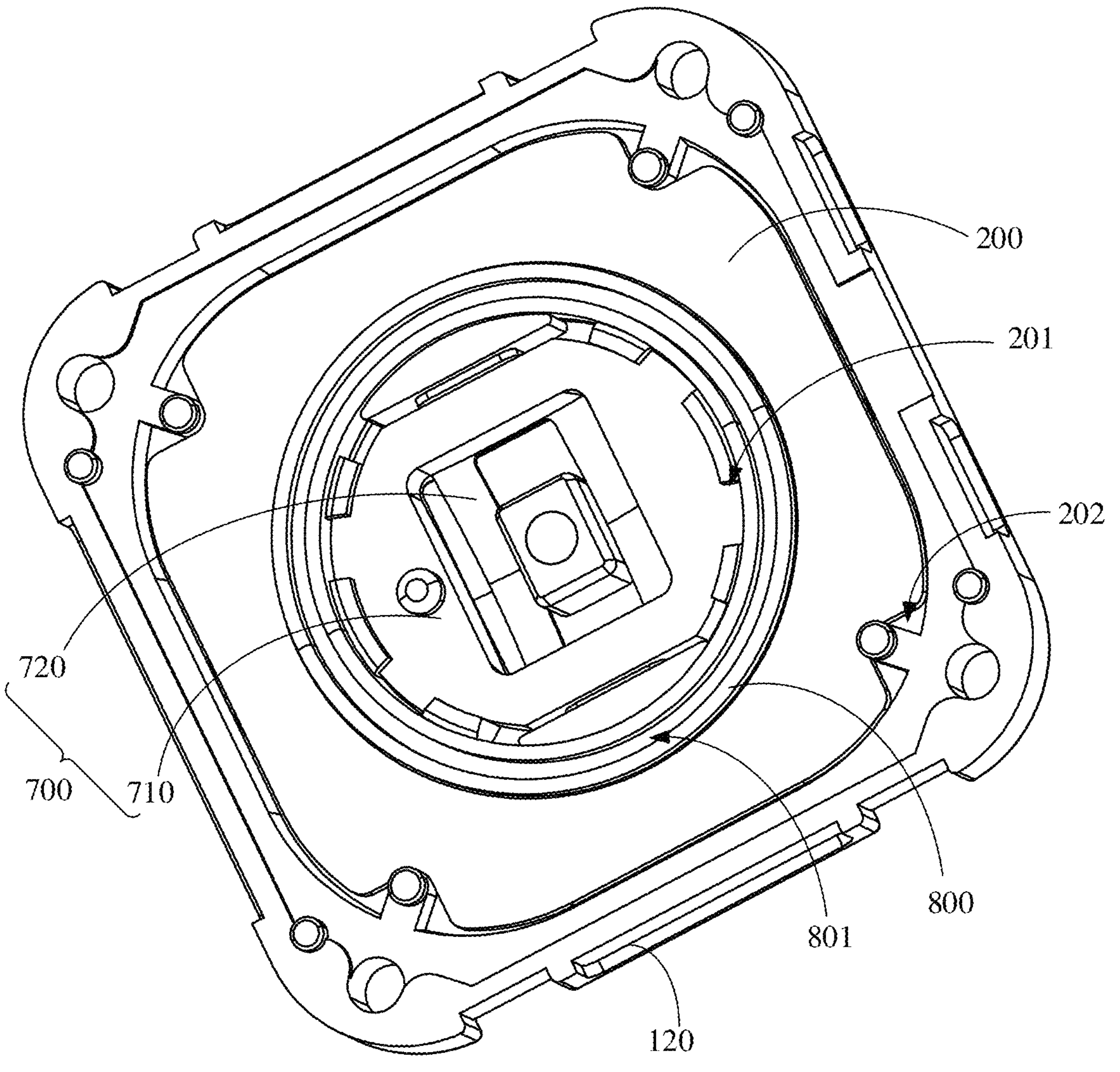
FIG. 6 is a schematic structural view of FIG. 1 after a base and a circuit board are hidden.

In an embodiment, as shown in FIG. 6, the rocker device 10 further includes an elastic member 800, part of the elastic member is provided between the support 200 and the first limiter 710, and the elastic member 800 is abutted against the circuit board 600, or the elastic member 800 is abutted against the base 110. Thus, the user can press the rocker 300 downward by setting the elastic member 800, thereby realizing the input of position information in multiple directions (usually the Z axis). In addition, the elastic member 800 can play a resetting role.

In an embodiment, a groove 801 is provided on one side of the elastic member 800 facing the base 110. The groove 801 can be an annular groove 801, and the groove 801 is configured to extend along the circumference of the elastic member 800. In an embodiment, a plurality of grooves 801 may be provided at intervals along the circumference of the elastic member 800.

In an embodiment, a remote control includes a remote control body, and a rocker device 10 as described above. Since the remote control adopts all the technical solutions of all the above embodiments, it has at least all the beneficial effects brought by the technical solutions of the above embodiments, which will not be repeated herein. The rocker device 10 is installed on the control body.

The above contents are only some embodiments of the present application, and do not limit the scope of the present application. All equivalent structural changes made by using the contents of the present application specification and drawings under the inventive concept of the present application, or directly/indirectly applied in other related technical fields are included in the scope of the present application.

What is claimed is:

1. A rocker device, comprising:

a shell;

a support provided in the shell, wherein the support and the shell enclose a cavity with an opening on a side;

a rocker comprising a rod body and a skirt provided at the rod body, wherein the skirt is movably provided at the cavity from the opening, the rod body comprises an operating end and a sensing end opposite to the operating end along an axial direction of the rod body, the sensing end is provided in the shell, and the operating end is configured to extend out of the shell;

a reset member provided in the cavity and provided around the support, wherein the reset member is abutted against a side of the skirt away from the rod body;

a hall sensor assembly comprising a hall element and a magnet, wherein the magnet is provided at the sensing end of the rod body, and the hall element corresponds to a position of the magnet; and a circuit board provided at the shell, wherein the hall element is provided on the circuit board and is electrically connected to the circuit board, wherein the shell comprises a base and an upper shell, the circuit board is provided on the base, an inner wall surface of the upper shell is a concave arc surface, a surface of the support close to the upper shell is a convex arc surface, and the operating end is configured to pass through the upper shell, and the rocker device further comprises a stop assembly, the stop assembly is provided between the support and the circuit board, and the stop assembly is sleeved on the sensing end of the rod body.

2. The rocker device of claim 1, wherein the stop assembly comprises a first limiter and a second limiter mounted on the first limiter, a spacing is formed between the first limiter and the support, the second limiter is movably provided at the spacing along the first limiter, the first limiter is provided with a first slide groove, the second limiter is provided with a second slide groove, an extension direction of the first slide groove intersects an extension direction of the second slide groove, and the sensing end is inserted into the first slide groove and the second slide groove.

3. The rocker device of claim 2, further comprising:

a convex strip, wherein the convex strip is provided on one side of the first limiter close to the second limiter, and the second limiter is mounted on the convex strip.

4. The rocker device of claim 2, wherein an outer wall of the first limiter is provided with a clamping portion, the support is provided with a clamping groove for mounting with the clamping portion, the upper shell is provided with a positioning portion, and the support is provided with a positioning groove corresponding to a position of the positioning portion.

5. The rocker device of claim 2, further comprising:

an elastic member, wherein a part of the elastic member is provided between the support and the first limiter, and the elastic member is abutted against the circuit board, or the elastic member is abutted against the base.

6. The rocker device of claim 5, wherein a groove is provided on one side of the elastic member facing the base.

7. The rocker device of claim 1, wherein the reset member is a tension spring connected end to end.

8. A remote control, comprising:

a remote control body; and the rocker device of claim 1.

* * * * *